(12) United States Patent
Rosenthal et al.

(10) Patent No.: US 8,608,127 B2
(45) Date of Patent: Dec. 17, 2013

(54) PIEZOELECTRIC PROPORTIONAL CONTROL VALVE

(75) Inventors: Richard Rosenthal, Mesa, AZ (US); Thomas Lohkamp, Phoenix, AZ (US); Robert Haines, Phoenix, AZ (US)

(73) Assignee: Fluke Corporation, Everett, WA (US)

( * ) Notice: Subject to any disclaimer, the term of this patent is extended or adjusted under 35 U.S.C. 154(b) by 294 days.

(21) Appl. No.: 13/012,713

(22) Filed: Jan. 24, 2011

(65) Prior Publication Data

US 2012/0186657 A1 Jul. 26, 2012

(51) Int. Cl.
F16K 31/02 (2006.01)

(52) U.S. Cl.
USPC .............. 251/86; 251/129.06; 251/129.08

(58) Field of Classification Search
USPC ............. 251/129.06, 129.08, 129.22, 84–88
See application file for complete search history.

(56) References Cited

U.S. PATENT DOCUMENTS

| | | | | |
|---|---|---|---|---|
| 3,418,980 | A * | 12/1968 | Benson | 123/294 |
| 5,094,430 | A * | 3/1992 | Shirai et al. | 251/86 |
| 5,100,100 | A * | 3/1992 | Benson et al. | 251/129.06 |
| 5,343,894 | A | 9/1994 | Frisch et al. | 137/625.65 |
| 6,062,533 | A | 5/2000 | Kappel et al. | 251/51 |
| 6,279,842 | B1 * | 8/2001 | Spain | 239/585.1 |
| 6,520,479 | B1 * | 2/2003 | Sato | 251/84 |
| 6,568,602 | B1 * | 5/2003 | Bram et al. | 239/5 |
| 6,575,138 | B2 * | 6/2003 | Welch et al. | 123/467 |
| 6,705,347 | B2 | 3/2004 | Itzhaky | 137/625.65 |
| 6,953,158 | B2 * | 10/2005 | Liskow | 239/102.2 |
| 7,309,027 | B2 * | 12/2007 | Magel et al. | 251/129.06 |
| 2003/0107013 | A1 * | 6/2003 | Pappo et al. | 251/129.06 |
| 2005/0017096 | A1 * | 1/2005 | Bachmaier et al. | 239/584 |
| 2005/0085990 | A1 | 4/2005 | Bohnig et al. | 701/104 |
| 2006/0112680 | A1 | 6/2006 | Beer et al. | 60/284 |
| 2006/0231068 | A1 | 10/2006 | Weiss et al. | 123/325 |

(Continued)

FOREIGN PATENT DOCUMENTS

| | | |
|---|---|---|
| DE | 19943142 | 4/2001 |
| DE | 10152903 | 5/2003 |

(Continued)

OTHER PUBLICATIONS

"Continental's Direct Injection Technology Saves on Fuel Consumption and Lowers Emissions by Twenty Percent", http://www.redorbit.com/news/business/1601307/continentals_direct_injection_technology_saves_on_fuel_consumption_and_lowers/index.html#, 2008, 2 pages.

(Continued)

*Primary Examiner* — John Bastianelli
(74) *Attorney, Agent, or Firm* — Christensen O'Connor Johnson Kindness PLLC

(57) ABSTRACT

A control valve has a piezoelectric actuator substantially immersed in a fluid and a sealing mechanism configured to be in a closed position and an open position. The piezoelectric actuator is configured to distort in response to an applied voltage causing the sealing mechanism to transition between the closed position and the open position. In the open position, the sealing mechanism allows fluid to flow therethrough. In response to removing the applied voltage, the piezoelectric actuator returns to an undistorted position causing the sealing mechanism to close and prevent fluid from flowing therethrough. In at least one embodiment, the piezoelectric actuator is configured to contract due to the fluid pressure, and the tube is configured to contract due to the fluid pressure to compensate at least in part for the contraction of the piezoeletric actuator.

19 Claims, 4 Drawing Sheets

(56) References Cited

U.S. PATENT DOCUMENTS

| | | | |
|---|---|---|---|
| 2006/0278196 A1 | 12/2006 | Beer et al. | 123/299 |
| 2006/0278837 A1* | 12/2006 | Kienzler et al. | 251/129.06 |
| 2007/0055436 A1 | 3/2007 | Weiss et al. | 701/101 |
| 2009/0314055 A1 | 12/2009 | Delajoud et al. | 73/1.72 |

FOREIGN PATENT DOCUMENTS

| | | |
|---|---|---|
| DE | 10244614 | 4/2004 |
| DE | 10341089 | 4/2005 |
| DE | 10341789 | 4/2005 |
| EP | 1124057 | 8/2001 |
| EP | 1296053 | 3/2003 |
| FR | 2855848 | 12/2004 |
| WO | 00/09878 | 2/2000 |
| WO | 2004/065775 | 8/2004 |
| WO | 2005/052344 | 6/2005 |

OTHER PUBLICATIONS

"Dynamic and Fuel Efficient: Innovative Solutions for Gasoline Engines", Siemens VDO Brochure, Apr. 2006, 4 pgages.

"Siemens VDO Takes the Direct Route to Injection; Gasoline Direct Injection Strategy Helps Engines Meet Emissions Targets Without Sacrificing Horsepower", http://www.findarticles.com/p/articles/mi_m0EIN/is_2006_April_6/ai_n26822203/, Apr. 2006, 3 pages.

* cited by examiner

PIEZOELECTRIC PROPORTIONAL CONTROL VALVE

BACKGROUND

A control valve is typically used to control the flow of a fluid under pressure. The valve can be "opened" to allow or increase fluid flow, and can also be "closed" to prevent or reduce the flow of fluid. As a result, by controlling the opening and closing of the valve, flow rate of the fluid can be changed. In some applications the fluid may be under high pressure, and the actuation of the valve requires relatively high actuation forces to overcome the pressure and open or close the valve. In some applications, precisely controlling the actuation of the valve, for example, opening or closing the valve by a repeatable and small amount or with minimal backlash, is desirable. Also, it may be desirable in some applications to be able to quickly and accurately adjust the opening or closing of a valve.

An example of a control valve is a motor driven needle valve. Although motor driven needle valves typically consume little power and provide high actuation forces, they may be slow to respond and exhibit behavior that reduces sensitivity and resolution, such as backlash. Another example of a control valve is a solenoid driven valve. Although these valves are fast and provide good resolution, these valves typically consume a large amount of power and provide limited actuation forces.

BRIEF DESCRIPTION OF THE DRAWINGS

Various features of the present disclosure will become more fully apparent from the following summary, detailed description, and appended claims, taken in conjunction with the accompanying drawings. Understanding that these drawings merely depict several examples in accordance with the disclosure, and therefore, are not to be considered limiting of its scope; the disclosure will be described with additional specificity and detail through use of the accompanying drawings.

SUMMARY

Figure 1A:
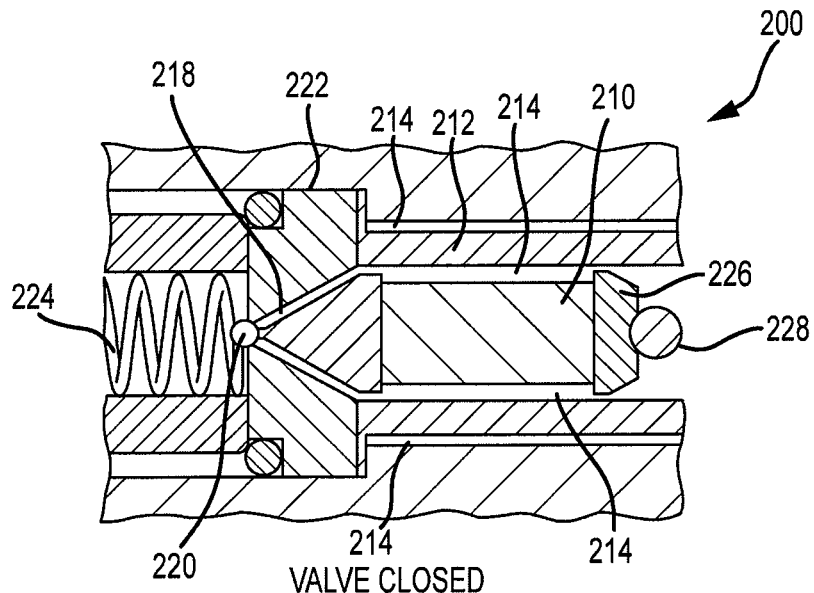
FIG. 1 is a schematic illustration of a control valve, in accordance with at least some of the examples of the present disclosure.

The present disclosure describes a control valve and method of operating a control valve. The control valve may further include a piezoelectric actuator. The piezoelectric actuator may be configured to deform in response to an applied voltage. The control valve may further include a sealing mechanism associated with the piezoelectric actuator. The sealing mechanism may be configured to be in a closed position and an open position. When the sealing mechanism is in the closed position, the sealing mechanism is configured to prevent the fluid from flowing through the control valve. The sealing mechanism may be in the open position in response to the piezoelectric actuator deforming, thereby allowing the fluid to flow through the control valve.

The present disclosure describes a method of operating a control valve. The method may include applying a voltage to a piezoelectric actuator, thereby causing the piezoelectric actuator to distort. The method may further include a response to the piezoelectric actuator distorting to create an opening, thereby allowing pressurized fluid to flow through the valve.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. In the drawings, similar symbols typically identify similar components, unless context dictates otherwise. The illustrative examples described in the detailed description, drawings, and claims are not meant to be limiting. Other examples may be utilized and other changes may be made without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are implicitly contemplated herein.

This disclosure is drawn, inter alia, to methods, systems, devices, and/or apparatus generally related to a control valve. In some examples, a proportional control valve comprises a piezoelectric actuator substantially immersed in a fluid in a manifold. The control valve may further include a sealing mechanism configured to be in a closed position and an open position. The piezoelectric actuator may be configured to distort in response to applying a voltage to the piezoelectric actuator. The distortion of the piezoelectric actuator causes the sealing mechanism to be in the open position, allowing the fluid to flow therethrough. In response to ceasing application of the voltage to the piezoelectric actuator, the piezoelectric actuator returns to its undistorted position, thereby causing the sealing mechanism to be in the closed position, preventing the fluid from flowing therethrough. In some embodiments, the control valve allows fluid flow in proportion to the voltage applied to the piezoelectric actuator.

Figure 1B:
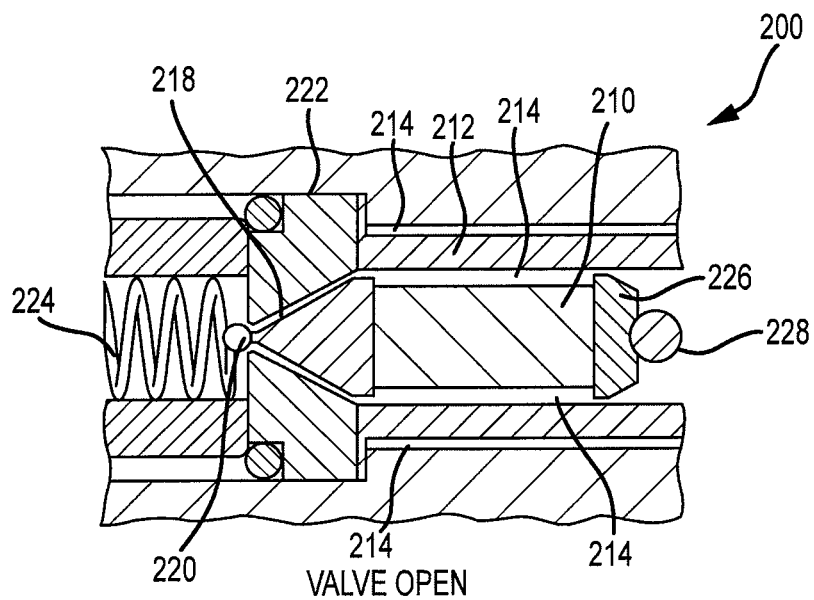

FIG. 1 is a schematic illustration of a cross section of a control valve assembly 200, in accordance with at least some of the examples of the present disclosure. FIG. 1A illustrates the control valve assembly 200 having a sealing mechanism in a closed position, preventing fluid from flowing through the valve. FIG. 1B illustrates the control valve assembly 200 having the sealing mechanism in an open position, allowing fluid to flow through the valve. The control valve assembly 200 includes a piezoelectric actuator 210 located within a tube 212. The piezoelectric actuator 210 may be constrained at a first end by a cone 218 and a ball 220 and a second end by a ball mount 226, a ball 228 and a screw (not shown). The piezoelectric actuator 210 may be any material configured to exhibit a piezoelectric effect. The piezoelectric actuator 210 may be a material configured to deform in response to an applied electric field. In some examples, the piezoelectric actuator 210 is a ceramic actuator, such as a PI Ceramic Monolithic Multilayer Actuator (PICMA®). The piezoelectric actuator 210 may be coupled to a power source (not shown).

The piezoelectric actuator 210 and the tube 212 are positioned in a chamber 214. The chamber may contain the fluid to be controlled by the control valve assembly 200. Placing the piezoelectric actuator 210 in the chamber 214 with the fluid to be controlled may eliminate the need for a dynamic seal between the actuator and sealing mechanism. As known, dynamic seals introduce friction and may make it more difficult to precisely control the position of the ball 220 to provide a desired conductance. The first end of the piezoelectric actuator 210 comprises the sealing mechanism. The sealing mechanism may include a seat 222 configured to receive the ball 220 to create a seal. In some embodiments, the seat 222 is configured to receive other types of sealing components, for example, cones, poppets, or other parts may be used to seal against the seat 222. Additionally, other valve configurations can be used in alternative embodiments. When the control valve assembly 200 is in the closed position, the ball 220 is pressed against the seat 222 by a spring 224. For instance, spring 224 may be a compression spring configured to apply a force to the ball 220 forcing the ball into the seat 222. The ball 220 fits into seat 222 in a manner that prevents fluid from being emitted therebetween. The sealing mechanism may include a needle or plunger, or any other device capable of creating a seal with a seat, rather than the ball 220.

To open the control valve assembly 200, a voltage may be applied to the piezoelectric actuator 210. For instance, the power source (not shown) may be configured to apply a voltage to the piezoelectric actuator 210. In response to the applied voltage, the piezoelectric actuator 210 may expand causing the ball 220 to apply a force against the spring 224. The force causing the ball 220 to press against the spring 224 may be greater than the spring force thereby causing the spring 224 to compress. Movement of the ball 220 creates an opening between the ball 220 and the seat 222 allowing the fluid to flow therebetween. In some examples, such as when the fluid is a gas, the piezoelectric actuator 210 may move the ball 220 less than a micrometer. In some examples, the opening between the ball 220 and the seat 222 caused by the piezoelectric actuator 210 allows fluid flow proportional to the voltage applied to the piezoelectric actuator 210. To close the valve assembly 220, the electric field applied to the piezoelectric actuator 210 may be reduced or is no longer applied. As a result, the spring force may become greater than the force being applied to it by the piezoelectric actuator 210, thus closing the opening between the ball 220 and the seat 222 to prevent the fluid from flowing therebetween, or in examples of a proportional control valve, reduce fluid flow therethrough. In another example, the control valve assembly 200 may be designed and configured to remain closed in response to applying a voltage to the piezoelectric actuator 210 and to be opened in response to no longer applying the voltage. In this example, the ball 220 may be located on the opposite surface of the seat 222.

The fluid that flows through the control valve assembly 200 may be a gas or liquid. In some examples, the control valve assembly 200 may be exposed to fluids in the chamber 214 at high pressures, such as 100 MPa. At high pressure, the effects of the hydrostatic fluid pressure on the components of the control valve assembly may affect the operation of the control valve. For instance, the hydrostatic pressure from the fluid in the chamber 214 applies pressure to the outer surfaces of the piezoelectric actuator 210 and the cone 218, which may cause the piezoelectric actuator 210 to contract. As a result, the ball 220 may move closer to the seat 222, which reduces fluid flow, or may not be moved off the seat 222, which causes the valve to remain closed. Having the tube 212, piezoelectric actuator 210, and cone 218 together in the chamber 214 may, however, reduce the impact the pressure has on the operation of the control valve 200. That is, the pressure applied to the piezoelectric actuator 210 and the cone 218 is also applied to the tube 212, causing it to contract as well. Contraction of the tube increases the distance between the ball 220 and the seat 222. As a result, although the pressure on the piezoelectric actuator 210 and the cone 218 may cause the ball 220 to move closer to the seat 222, that may be compensated for by the tendency for the distance between the ball and the seat to increase as the tube 212 reacts to the pressure. Thus, the hydrostatic effects on the piezoelectric actuator 210, the cone 218, and the tube 212 may offset one another and prevent hydrostatic pressures within the assembly from affecting operation of the valve.

Figure 2:
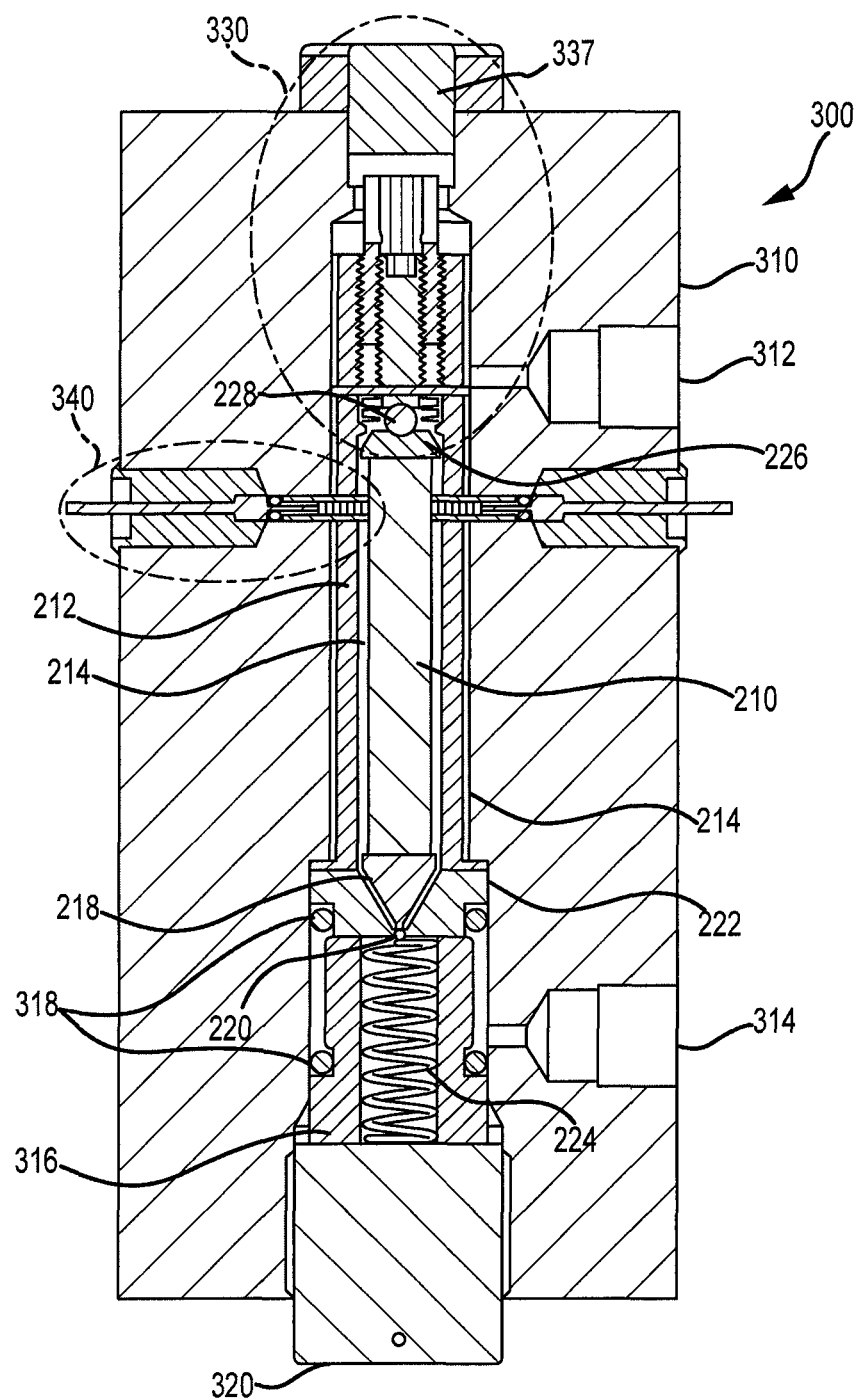
FIG. 2 is a cross-sectional view of a housing comprising the control valve assembly of FIG. 1, in accordance with at least some of the examples of the present disclosure.

FIG. 2 is a cross-sectional view of a manifold 300 comprising a control valve assembly in accordance with at least some of the examples of the present disclosure. The control valve assembly 200 of FIG. 1 is an example of such a control valve, and is shown in FIG. 2. The manifold 300 includes a manifold body 310 having an inlet 312 and an outlet 314. The position of the inlet 312 and the outlet 314 is provided for illustrative purposes and the inlet 312 and outlet 314 may be positioned in another location than is shown. In some examples, 312 is the outlet and 314 is the inlet depending on the direction in which a fluid within the manifold body 310 flows. At a first end of the control valve assembly 200, the manifold 300 includes a carrier 316 and o-rings 318. The o-rings prevent leaks between the manifold body 310 and the seat 222 and the manifold body 310 and the carrier 316. A set screw 320 may be placed within an opening in the manifold body 310 at the first end. The set screw 320 may be configured to hold the carrier 316 and the spring 224 in position.

In some examples, the configuration of the control valve 200 may allow the piezoelectric actuator 210 to deflect (e.g., bend, bow) within the tube 212. For instance, at the first end of the piezoelectric actuator 210, the cone 218 may be configured to rotate relative to the ball 220. At the second end of the piezoelectric actuator 210, the mount 226 may be configured to rotate relative to the ball 228. Allowing the piezoelectric actuator 210 to deflect within the tube 212 at each end may prevent or at least reduce cracking of the piezoelectric actuator 210 due to bending stress. For instance, in the example in which the piezoelectric actuator 210 is a ceramic piezoelectric actuator, the ceramic piezoelectric actuator may be brittle. As voltage is applied to the ceramic piezoelectric actuator and the ceramic piezoelectric actuator expands in response to the voltage, it may bend slightly. The ability for the ceramic piezoelectric actuator to deflect may assist in preventing bending stress fractures therein.

Figure 3:
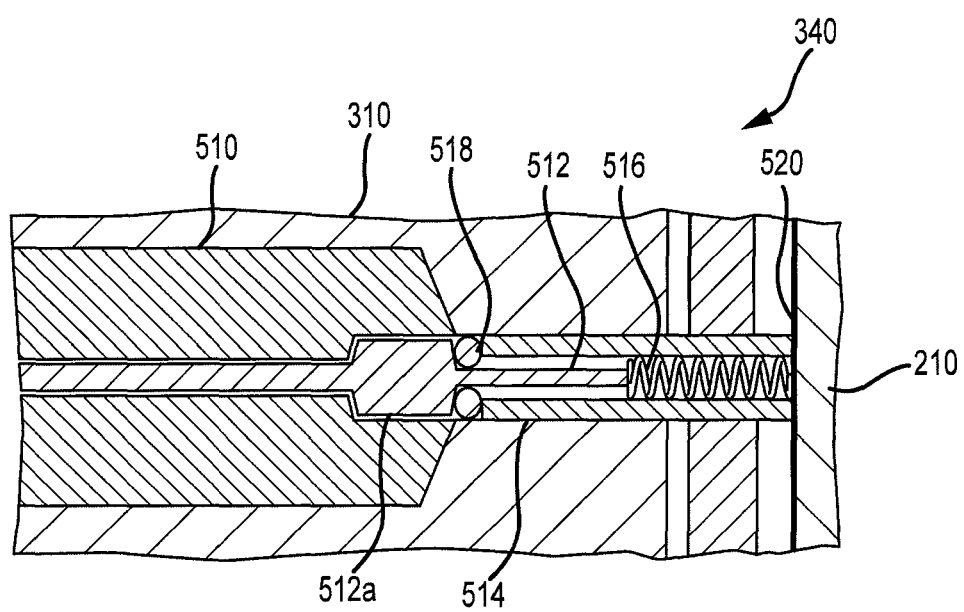
FIG. 3 is a schematic illustration of the electrical pass-through system 340 in FIG. 2, in accordance with at least some of the examples of the present disclosure.

The manifold body 310 may further include one or more electrical pass-through systems 340. FIG. 3 is a schematic illustration of one of the electrical pass-through systems 340 in FIG. 2, in accordance with at least some of the examples of the present disclosure. The electrical pass-through system 340 may be configured to isolate a conductive wire that is configured to couple a power source (not shown) to a contact pad 520 on the piezoelectric actuator 210 from the manifold body 310 and the first and second fluid paths 214 and 216. The electrical pass through pass-through system 340 may include an insulative nut 510, an insulative tube 514, a conductive wire 512, and a spring 516. The insulative nut 510 may have threads (not shown) on an outer surface thereof configured to be coupled to threads in the manifold 310. An end of the insulative nut 510 may be coupled to an end of the insulative tube 514. In another example, the insulative nut 510 and the insulative tube 514 are a single unit. The spring 516 and the conductive wire 512 may be provided inside the insulative nut 510 and the insulative tube 514 and are in electrical communication with one another. An end of the wire 512 extending from the insulative nut 510 may be coupled to a power source (not shown), such as via a conductive cable. An end of the spring 516 may be coupled to a contact pad 520 on the piezoelectric actuator 210 to provide electrical communication to the power source and the piezoelectric actuator 210. The power source may be configured to provide a voltage to the piezoelectric actuator 210 to open the valve and to provide a voltage to the piezoelectric actuator 210 to close the valve as described in reference to FIG. 1. In one example, the power source may be configured to apply 120 DC volts to the piezoelectric actuator. The electrical pass-through system 340 may further include an o-ring 518 to minimize external pressure forces being applied to the conductive wire 512 and/or to create a seal between the nut 510 and the insulative tube 514. The conductive wire 512 may include a wider section 512a configured to prevent the wire 512 from being expelled from the insulative nut 510 and/or insulative tube 514 due to high hydrostatic fluid pressure in the first and second fluid paths 214 and 216.

Figure 4:
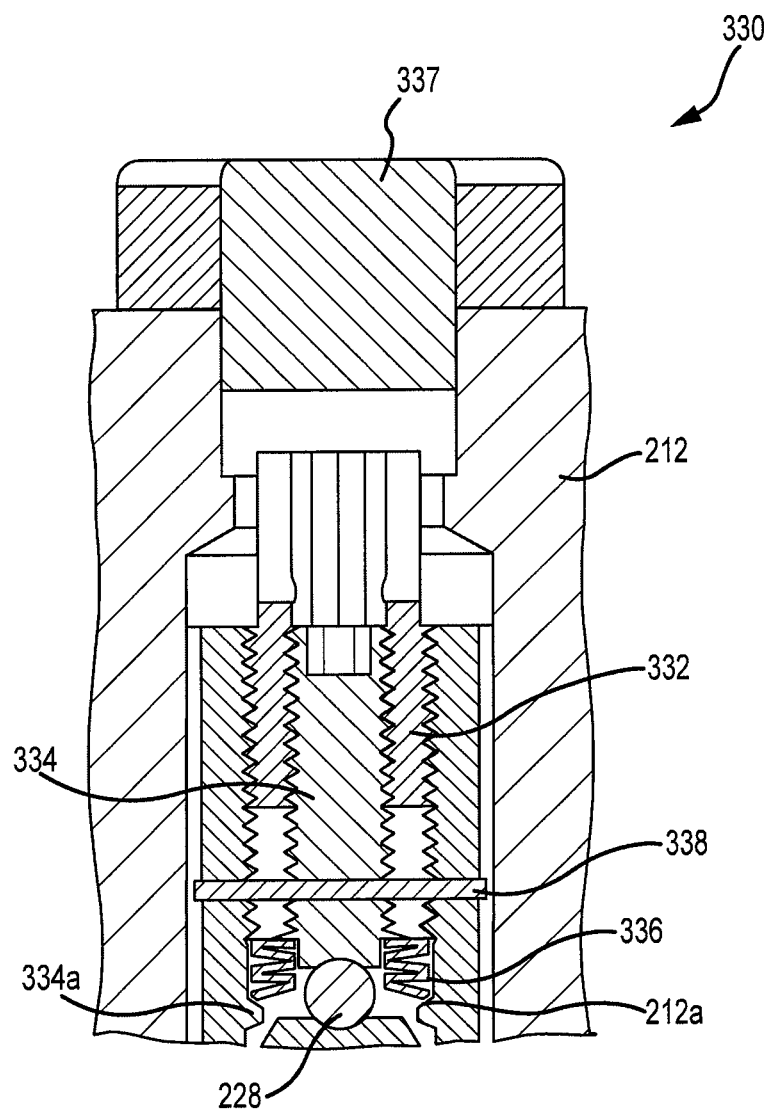
FIG. 4 is a schematic illustration of the adjustment assembly of FIG. 3, in accordance with at least some of the examples of the present disclosure.

Referring again to FIG. 2, the manifold 300 may include an adjustment assembly 330 at the second end of the manifold body 310. FIG. 4 is a schematic illustration of the adjustment assembly 330 in FIG. 2, in accordance with at least some of the examples of the present disclosure. The adjustment assembly 330 may be configured to increase and/or decrease the amount of force being applied to the second end of the piezoelectric actuator 210. The adjustment assembly 330 may include a nut 332, a screw 334, spring 336 and a pin 338. A cap 337 seals an access opening of the adjustment assembly 330. An end of the screw 334 may be configured to distribute a force to the piezoelectric actuator via the ball 228. The nut 332 may include internal and external threads. The pitch of the internal threads of the nut 332 may be different from the pitch of the external threads. The external threads of the nut 332 may be configured to mate with internal threads of the tube 212. The screw 334 may have external threads configured to mate with the internal threads of the nut 332.

The adjustment assembly 330 may be configured to adjust the position of the piezoelectric actuator 210 relative to the seat 222 and the ball 220 by adjusting the position of the second end of the piezoelectric actuator 210. Adjustment of the piezoelectric actuator 210 may be obtained by rotating the screw 334 and/or nut 332 relative to the manifold body 310 in a first direction to reduce the amount of force applied to the second end of the piezoelectric actuator 210 and in a second direction to increase the amount of force applied to the second end of the piezoelectric actuator 210. Access to the nut 332 and the screw 334 is provided through an opening in the manifold body 310. In some examples, the external thread pitch and the internal thread pitch of the nut 332 are selected to allow less than a micrometer of adjustment per degree of rotation of the screw 334 or nut 332. Coarse adjustment may be obtained by rotating the screw 334 relative to the nut 332 or rotating the screw 334 and the nut 332 together relative to the tube 212. Fine adjustment may be obtained by rotating the nut 332 without rotating the screw 334. In some examples, the pin 338 may be provided through an opening in the tube 212 and the screw 334 to prevent the rotation of the screw 334 relative to tube 212 when rotating the nut 332 for fine adjustment.

A first end of the spring 336 may rest against a step 334a at an end of the screw 334 and a second end of the spring may rest against a step 212a on an inner surface of the tube 212. The spring 336 may be configured to apply a load to the threads of the screw 334 and/or nut 332 to prevent or reduce backlash and/or adjustment due to vibration. In some examples, the spring 336 comprises a stack of conical washers.

While various aspects and examples have been disclosed herein, other aspects and examples will be apparent to those skilled in the art. The various aspects and examples disclosed herein are for purposes of illustration and are not intended to be limiting, with the true scope and spirit being indicated by the following claims.

What is claimed is:

1. A method of operating a control valve to allow a pressurized fluid to flow therethrough, the method comprising:
    applying a voltage to a piezoelectric actuator positioned in a tube, both of which are substantially immersed in the pressurized fluid, thereby causing the piezoelectric actuator to distort, wherein the piezoelectric actuator and the tube are subject to deformation caused by the pressure of the pressurized fluid; and
    in response to the piezoelectric actuator distorting, displacing a seal in a first direction to create an opening thereby allowing pressurized fluid to flow therethrough,
    wherein the deformation of the piezoelectric actuator caused by the pressure of the pressurized fluid results in a first effect on the flow of the pressurized fluid, and the deformation of the tube caused by the pressure of the pressurized fluid results in a second effect on the flow of the pressurized fluid, the second effect compensating at least in part for the first effect.

2. The method of claim 1 wherein the piezoelectric actuator distortion comprises expansion of the piezoelectric actuator in at least one direction.

3. The method of claim 2 further comprising ceasing application of the voltage to the piezoelectric actuator to cause the piezoelectric actuator to contract, and in response to the piezoelectric actuator contracting, resealing the seal thereby preventing the pressurized fluid from flowing.

4. The method of claim 1 wherein the fluid comprises a non-conductive gas or liquid.

5. The method of claim 1 wherein displacing the seal in the first direction comprises displacing the seal less than one micrometer.

6. The method of claim 1 wherein the piezoelectric actuator comprises a ceramic piezoelectric actuator.

7. The method of claim 1 wherein displacing the seal in the first direction to create an opening allows pressurized fluid to flow therethrough in proportion to the voltage applied to the piezoelectric actuator.

8. A control valve assembly, comprising:
    a chamber configured to contain a fluid to be controlled by the control valve assembly;
    a tube positioned in the chamber and substantially immersed in the fluid to be controlled;
    a piezoelectric actuator configured to be positioned in the tube and substantially immersed in the fluid to be controlled, and further configured to deform in response to an applied voltage, wherein the tube and piezoelectric actuator are subject to the same fluid pressure in the chamber; and
    a sealing mechanism associated with the piezoelectric actuator, wherein the sealing mechanism is movable between a closed position and an open position, the sealing mechanism being configured in the closed position to prevent the fluid from flowing therethrough, and being configured in the open position to allow the fluid to flow therethrough, wherein the piezoelectric actuator is configured to deform to move the sealing mechanism between the closed and open positions, wherein the piezoelectric actuator is configured to contract due to the fluid pressure, and wherein the tube is configured to contract due to the fluid pressure to compensate at least in part for the contraction of the piezoelectric actuator.

9. The control valve of claim 1 wherein the piezoelectric actuator is configured to pivot within the tube in response to a bending force.

10. The control valve of claim 1 wherein the sealing mechanism comprises a spring, a sealing component, and a seat, and wherein the spring applies a force to seat the sealing component in the seat when the sealing mechanism is in the closed position.

11. The control valve of claim 10 wherein the sealing component comprises a ball, cone, or poppet.

12. The control valve of claim 10 wherein the piezoelectric actuator deforms by extending in length thereby causing the sealing component to unseat from the seat when the sealing mechanism is in the open position.

13. The control valve of claim 1 wherein the piezoelectric actuator comprises a ceramic piezoelectric actuator.

14. The control valve of claim 1 further comprising a housing in which the sealing mechanism is positioned, the housing including a pass-through extending from an outer surface of the housing to an inner surface of the housing, the pass-through having a conductive material therein configured to be electrically coupled to the piezoelectric actuator to apply a voltage to the piezoelectric actuator.

15. The control valve of claim 14 wherein the sealing mechanism is in the closed position when the voltage is not applied to the piezoelectric actuator.

16. The control valve of claim 1 wherein the fluid comprises a pressurized fluid.

17. The control valve of claim 16 wherein the fluid is pressurized between 0 MPa to about 100 MPa.

18. The control valve of claim 1 wherein the fluid comprises a non-conductive gas or liquid.

19. The control valve of claim 1 wherein the piezoelectric actuator is configured to deform to move the sealing mechanism and alter fluid flow therethrough proportional to the applied voltage.

* * * * *